United States Patent [19]

Yanagishita

[11] Patent Number: 5,102,322
[45] Date of Patent: Apr. 7, 1992

[54] MOLD FOR SKIN COVERED FOAMED PLASTIC MOLDING

[75] Inventor: Norio Yanagishita, Ayase, Japan

[73] Assignee: Ikeda Bussan Co., Ltd., Kanagawa, Japan

[21] Appl. No.: 622,224

[22] Filed: Dec. 3, 1990

Related U.S. Application Data

[63] Continuation of Ser. No. 377,715, Jul. 10, 1989, abandoned.

[30] Foreign Application Priority Data

Jul. 26, 1988 [JP] Japan .............................. 63-98873[U]

[51] Int. Cl.$^5$ ....................... B29C 33/76; B29C 39/10
[52] U.S. Cl. ...................................... 425/117; 249/63; 249/95; 249/142; 249/177; 264/46.4; 425/577; 425/DIG. 10
[58] Field of Search .................. 249/151, 177, 63, 122, 249/124, 125, 83, 95, 96, 97, 142, 175; 425/577, DIG. 10, 117, 125, 388, 4 R, 817 R; 264/46.4, 46.6, 46.8

[56] References Cited

U.S. PATENT DOCUMENTS

| | | | |
|---|---|---|---|
| 3,318,563 | 5/1967 | Downing | 249/151 |
| 4,153,657 | 5/1979 | Wilcox | 264/46.6 |
| 4,213,932 | 7/1980 | Young | 425/DIG. 10 |
| 4,420,447 | 12/1983 | Nakashima | 264/46.8 |
| 4,647,419 | 3/1987 | Helfer et al. | 425/577 |
| 4,693,861 | 9/1987 | Lapeyre | 249/184 |
| 4,793,793 | 12/1988 | Swenson et al. | 264/46.8 |
| 4,923,378 | 5/1990 | Omata et al. | 425/577 |

FOREIGN PATENT DOCUMENTS

| | | |
|---|---|---|
| 0097040 | 12/1983 | European Pat. Off. . |
| 3909065 | 10/1989 | Fed. Rep. of Germany . |
| 61-62487 | 3/1986 | Japan .................. 264/46.6 |
| 0897863 | 5/1962 | United Kingdom . |
| 1023886 | 3/1966 | United Kingdom . |
| 1126909 | 9/1968 | United Kingdom . |
| 1179306 | 1/1970 | United Kingdom . |
| 2092509 | 8/1982 | United Kingdom . |
| 2190621 | 11/1987 | United Kingdom . |

Primary Examiner—Jay H. Woo
Assistant Examiner—Khanh P. Nguyen
Attorney, Agent, or Firm—Weiser & Stapler

[57] ABSTRACT

A mold for skin covered foamed plastic molding which utilizes a middle mold to be placed between an upper mold and a lower mold, capable of reducing the weight of the middle mold so that assembling of the middle mold becomes less troublesome, the assemblage becomes more stable and the appearance of undesirable spacing in the assemblage an be prevented. The mold includes an upper mold to be closed over the lower mold, having a bent portion with a bottom surface which is to be a part of molding surface; and a middle mold to be placed between the upper mold and the lower mold, having a hollow region into which the bent portion of the upper mold is to be engaged when assembled.

8 Claims, 5 Drawing Sheets

MOLD FOR SKIN COVERED FOAMED PLASTIC MOLDING

This application is a continuation of application Ser. No. 07/377,715 filed July 10, 1989 now abandoned.

BACKGROUND OF THE INVENTION

1. Field of the Invention

The present invention relates to a mold for foamed plastic molding a suitable for molding foamed plastic article such as to be used for car seat cushions and seat backs in conjunction with skin covers and, more particularly, to such a skin covered foamed plastic molding which utilizes a middle mold between an upper mold and a lower mold.

2. Description of the Background Art

Car seat cushions and seat backs have been made of a pad member covered by a skin cover. The pad member and the skin cover used to be manufactured separately and combined together later, but it has become fashionable to manufacture a skin covered pad member altogether by forming foamed plastic in a skin cover laid over a mold, so that the process of combining at a later time may be omitted.

However, the contemporary car seats tend to have large side support portions with large curving so that it becomes difficult to place the skin cover neatly over the mold. As a consequence, in order to obtain a skin covered pad member of desired shape it is necessary for the skin cover to be pinned down or taped to the mold, which is an additional complication in the manufacturing process.

To cope with such problems, a mold 1 as shown in FIG. 1, comprising a lower mold 2, an upper mold 3, and a middle mold 4 to be placed in between the former two is used frequently. In this mold 1, an upper portion 6 of the lower mold 2 is openable by means of a hinge 5. An edge 8a of a skin cover 8 is pinched between an end of this openable upper portion 6 and an extended portion 7 of the middle mold 4. The upper mold 3 is placed on top of the openable upper portion 6 of the lower mold 2 and of the middle mold 4.

However, in such a conventional mold 1, the middle mold 4 and the upper mold 3 are assembled such that the central portion of the upper mold 3 is resting on top of the central portion of the middle mold 4, as in FIG. 1, creating unnecessary overlaps there. As a result, the weight of either one of the middle mold 4 and the upper mold 3 is made unnecessarily large.

Also, as the middle mold 4 tends to get large and heavy, assembling the middle mold 4 get more troublesome, assemblage gets less stable, and undesirable spacing tends to appear in the assemblage.

SUMMARY OF THE INVENTION

It is therefore an object of the present invention to provide a mold for skin covered foamed plastic molding which utilizes a middle mold to be placed between an upper mold and a lower mold, capable of reducing the weight of the middle mold so that assembling of the middle mold becomes less troublesome, the assemblage becomes more stable and the appearance of undesirable spacing in the assemblage can be prevented.

This object of the present invention is achieved by providing a mold for skin covered foamed plastic molding, comprising a lower mold having a top surface to be a part molding surface, where a skin cover is to be placed over the top surface, and where liquid foam resin is to be poured onto the skin cover; an upper mold to be closed over the lower mold, having a depression or bent portion with a bottom surface which is to be a part of the molding surface; and a middle mold to be placed between the upper mold and the lower mold, having a hollow region into which the bent portion of the upper mold is to be engaged when assembled.

Other features and the advantages of the present invention will become apparent from the following description taken in conjunction with the accompanying drawings.

DETAILED DESCRIPTION OF THE PREFERRED EMBODIMENTS

Figure 1:
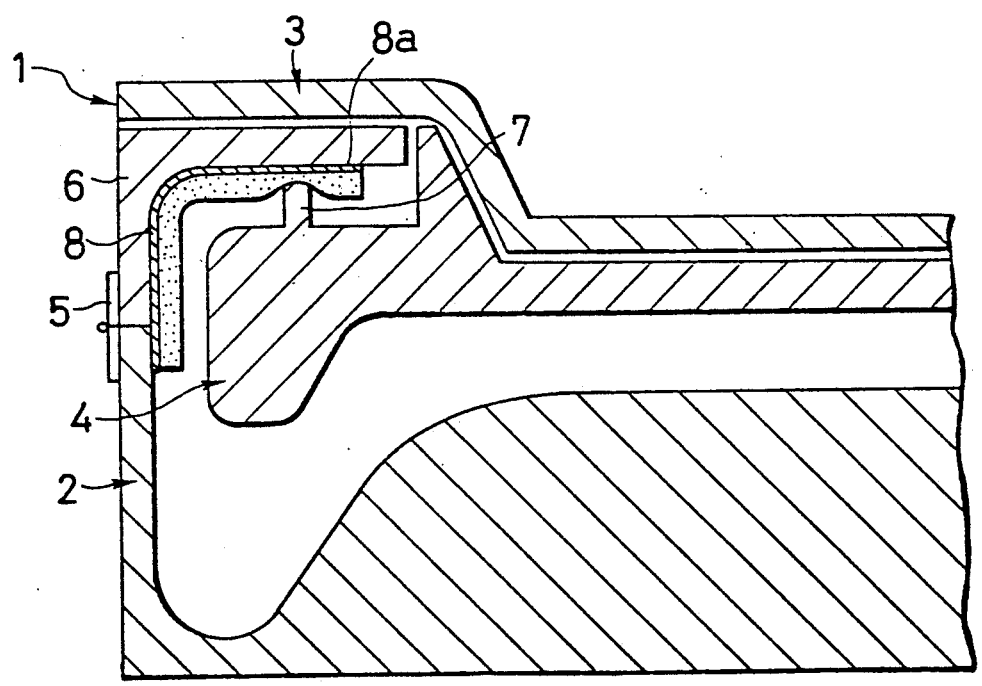
FIG. 1 is a partial cross sectional view of a conventional mold for skin covered foamed plastic molding.
Figure 2:
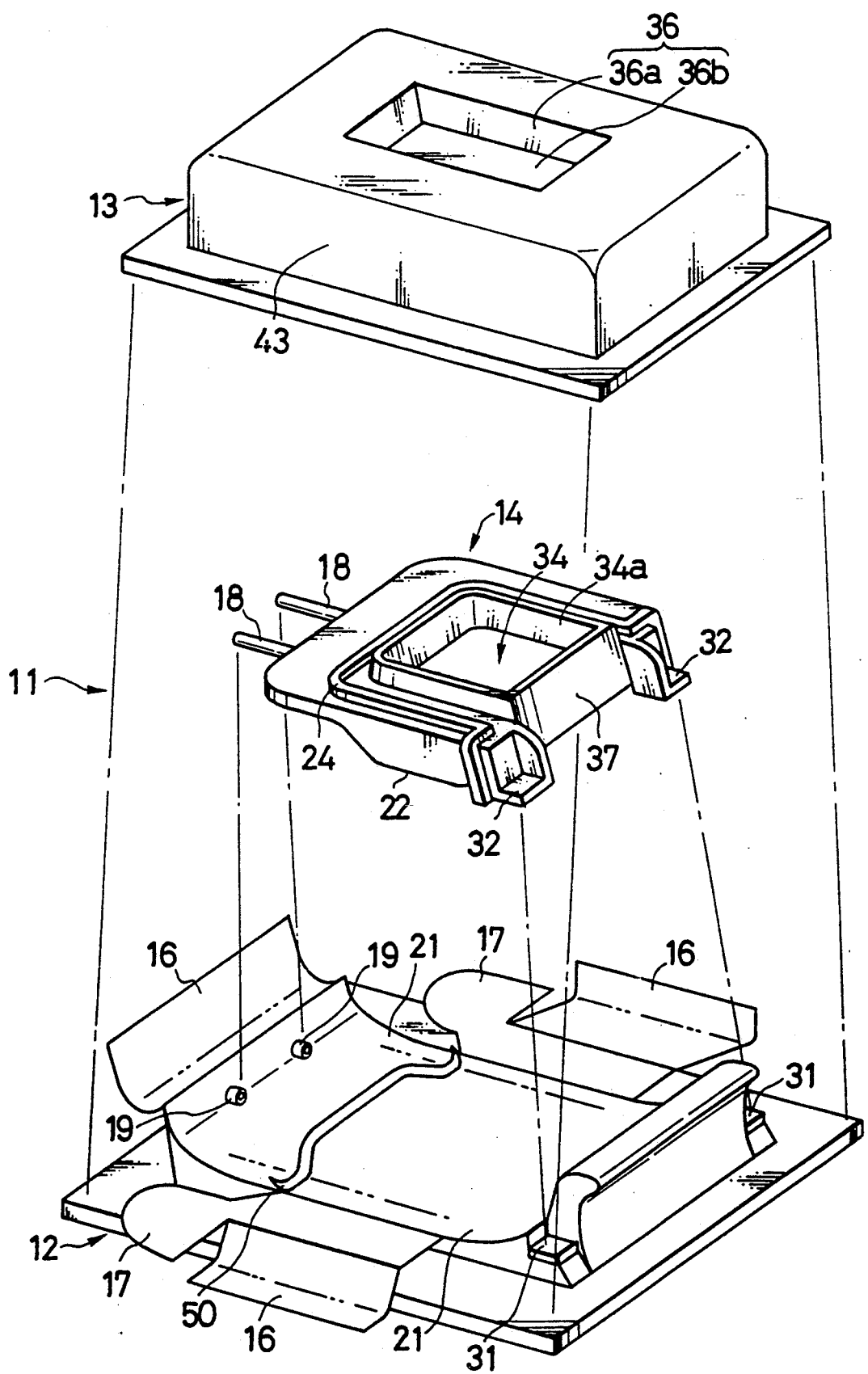
FIG. 2 is an expanded view of one embodiment of a mold for skin covered foamed plastic molding according to the present invention.
Figure 3:
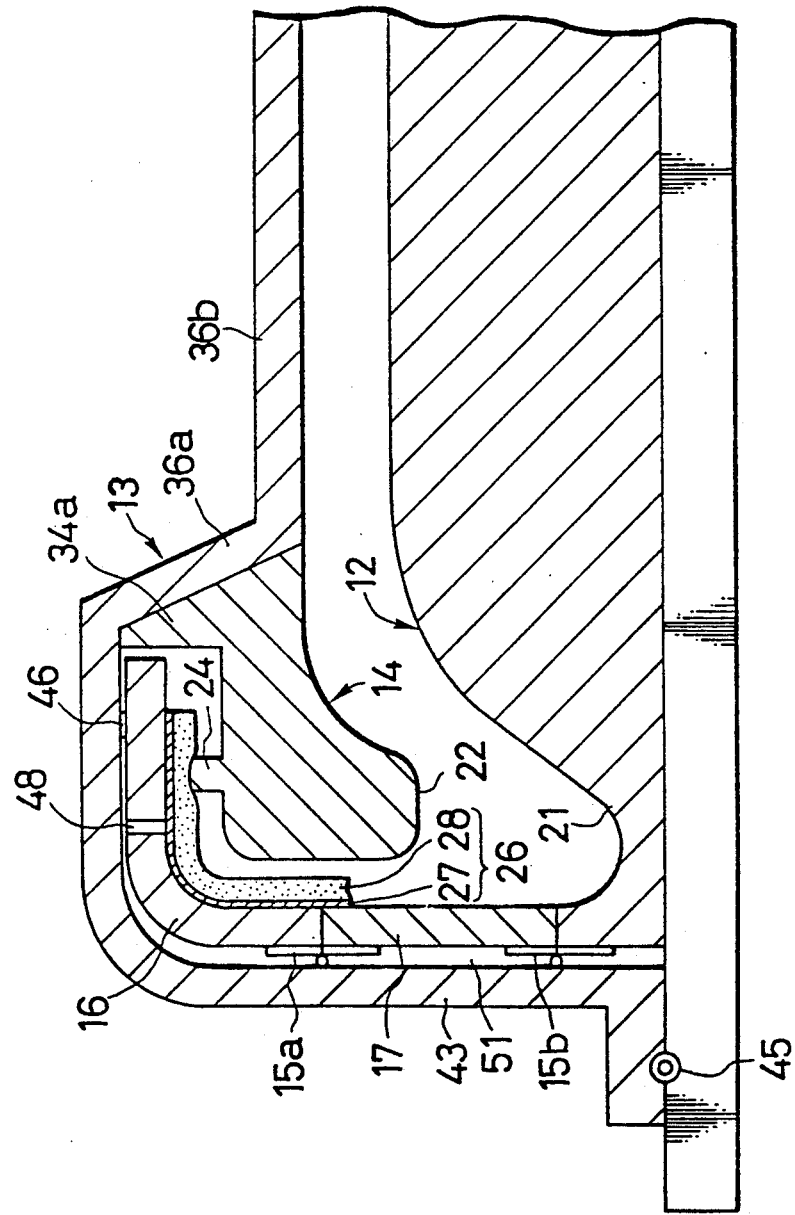
FIG. 3 is a partial cross sectional view of the mold for skin covered foamed plastic molding of FIG. 2.

Referring now to FIGS. 2 and 3, there is shown one embodiment of a mold for skin covered foamed plastic molding according to the present invention.

Figure 4A:
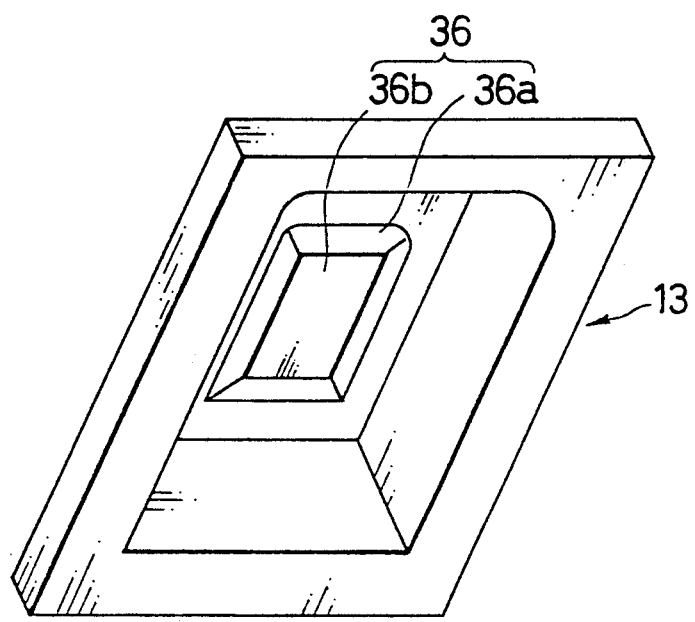
FIG. 4(A) is a perspective view of one embodiment of an upper mold for the mold for skin covered foamed plastic molding of FIG. 2.
Figure 4B:
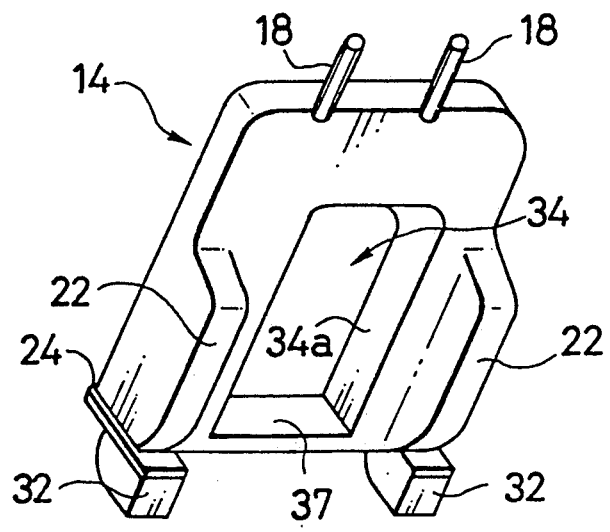
FIG. 4(B) is a perspective view of one embodiment of a middle mold for the mold for skin covered foamed plastic molding of FIG. 2.

In this embodiment, a mold 11 comprises a lower mold 12, an upper mold 13 to be placed over the lower mold 12, and a middle mold 14 to be inserted between the lower mold 12 and the upper mold 13. Bottom views of the upper mold 13 and the middle mold 14 are also shown in FIGS. 4(A) and 4(B), respectively.

Side portions 17 of the lower mold 12 are openable by means of lower hinges 15b and upper portions 16 at top and side edges of the lower mold 12, with approximate L-shape cross section, are openable by means of upper hinges 15a. There is a pair of holes 19 on a bottom surface of the top side of the lower mold 12 which receives a pair of supporting rods 18 of the middle mold 14. This pair of supporting rods 18 can also provide holes for receiving supporting rods of a head rest to be attached to a manufactured seat, if necessary. On a bottom of the lower mold 12 there is a wedge 50. Side portions 21 of the bottom of the lower mold 12 and bottoms of side portions 22 of the middle mold 14 form curved portions corresponding to side support portions of a seat cushion or a seat back to be manufactured. At two bottom side corners of the lower mold 12 there are indents 31 which receive support edges 32 of the middle mold 14. The middle mold 14 has a hollow 34 formed by a wall 34a and around this hollow 34 there is a ridge or hedge 24, except for a bottom side 37 of the middle mold 14. The upper mold 13 has a depression or bent 36 formed by a side wall 36a and a bottom face 36b which is to be engaged into the hollow 34 of the middle mold when assembled such that the bottom face 36b becomes a part of the molding surface corresponding to a back side of a seat cushion or a seat back to be manufactured. The side wall 36a of the upper mold 13 and the wall 34a of the middle mold 14 have slopes to facilitate easy engagement. Side portions 43 of the mold 13 are extended to reach a base of the lower mold 12 when assembled, at which time it is fixed by means of a lower packing 45, keeping a spacing 51 in between. There are also upper packings 46 and vent holes 48 on the openable upper portions 16 of the lower mold 12.

Now, the molding process using this mold 11 will be explained.

First, a skin cover 26 made of a surface skin 27 and a wadding 28 is placed over the lower mold 12. The middle mold 14 is then attached and the openable side portions 17 and upper portions 16 are closed such that edges of the skin cover 26 are pinched between the hedge 24 and the upper portions 16, as shown in FIG. 3.

Then, the liquid foam resin is poured in. Here, by controlling the pressure inside the spacing 51 between the lower mold 12 and the upper mold 13, it is possible to control the amount of liquid foam resin which penetrates into the wadding 28. Namely, when the pressure inside the spacing 51 is lowered, it becomes easier for the liquid foam resin to penetrate into the wadding 28 because the foaming gases can easily escape though the lower and upper hinges 15a and 15b, whereas when the pressure inside the spacing 51 is raised, it becomes harder for the liquid foam resin to penetrate into the wadding 28 because the foaming gases cannot easily escape though the lower and upper hinges 15a and 15b. This controlling of the pressure inside the spacing 51 can be accomplished by either changing the volume of the spacing 51 or by providing pressure by name of a controlling pump to the spacing 51.

Also, by means of the vent holes 48, the liquid foam resin can be circulated well enough to reach the region between the openable upper portions 16 and the middle mold 14. Here, it is preferable to provide valves to the vent holes 48 so that the vent holes 48 can be closed after an appropriate time from the pouring of the liquid foam resin.

After the pouring in of the liquid foam resin is completed, the upper mold 13 is assembled over the lower mold 12 and middle mold 14. Here, because of the extended side portions 43, excessive weight is prevented from being exerted onto the lower mold 12.

Finally, after the foaming process of the liquid foam resin is completed, the upper mold 13 is opened and the middle mold 14 is removed, so that a skin covered foamed plastic article composed of the skin cover 26 and the foam resin can be lifted out of the lower mold 12.

As explained, according to the present invention, it is possible to provide a mold for skin covered foamed plastic molding which utilizes a middle mold to be placed between an upper mold and a lower mold, capable of reducing the weight of the middle mold as the middle mold 14 has the hollow 34. Thus, the assembling of the middle mold 14 becomes less troublesome, the assemblage of the mold 11 becomes more stable and the appearance of undesirable spacing in the assemblage can be prevented.

Moreover, with this embodiment of the mold 11, setting of the skin cover 26 becomes easier. Furthermore, when the mold is to be utilized as a heating mold, heating of the middle mold 14 can be omitted, since the middle mold 14 has only small portions contacting the pad member to be made from the liquid foam resin.

Figure 5A:
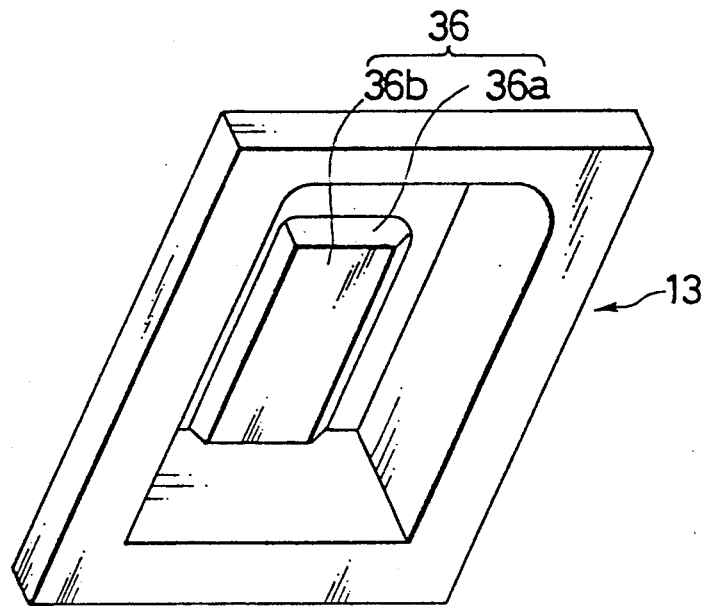
FIG. 5(A) is a perspective view of another embodiment of an upper mold for the mold for skin covered foamed plastic molding of FIG. 2.
Figure 5B:
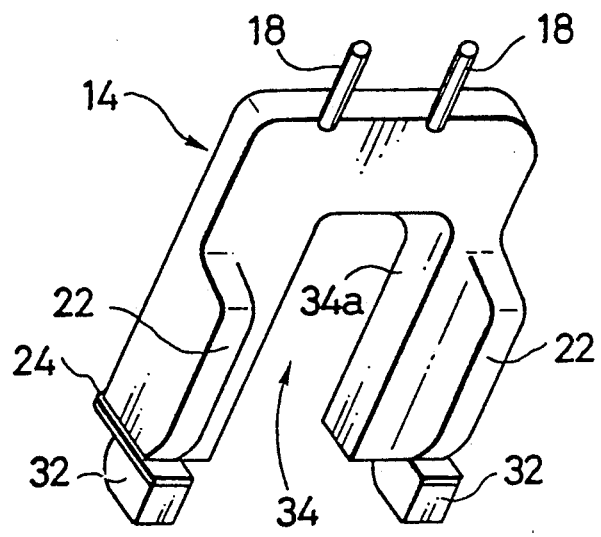
FIG. 5(B) is a perspective view of another embodiment of a middle mold for the mold for skin covered foamed plastic molding of FIG. 2.

It is to be noted that the upper mold 13 and the middle mold 14 shown in FIGS. 4(A) and 4(B), respectively, may be replaced by those shown in FIGS. 5(A) and 5(B), respectively, in which the bent 36 of the upper mold is extended all the way to a bottom side and the bottom side 37 is absent in the middle mold 14.

Besides this, many modifications and variations of the above embodiments may be made without departing from the novel and advantageous features of the present invention. Accordingly, all such modifications and variations are intended to be incorporated within the scope of the appended claims.

What is claimed isd

1. A mold for skin covered foamed plastic molding, comprising:
   a lower mold having middle mold support holes, and having a top surface onto which a skin cover is to be placed so that a liquid foam resin is poured onto the skin cover;
   an upper mold to be assembled with the lower mold and having a bent portion with a bottom surface which faces the top surface of the lower mold when the upper mold is assembled with the lower mold; and
   a middle mold to be placed between the upper mold and the lower mold and having supporting rod members to support the middle mold with respect to the lower mold by being inserted into the middle mold support holes of the lower mold, and having a hollow region extending therethrough for receiving the bent portion of the upper mold so that the top surface of the lower mold and the bottom surface of the upper mold face each other through the hollow region when the upper mold and the lower mold are assembled together with the middle mold placed therebetween.

2. The mold of claim 1, wherein the middle mold further includes four side walls surrounding the hollow region.

3. The mold of claim 1, wherein the middle mold further includes three side walls, and wherein the hollow region is surrounded by the three side walls and one open side.

4. The mold of claim 3, wherein the open side of the middle mold is closed by a portion of the bent portion when assembled.

5. The mold of claim 1, wherein the hollow region of the middle mold extends from an upper surface of the middle mold to a lower surface of the middle mold, and wherein the bottom surface of the bent portion cooperates with the lower surface of the middle mold to form a substantially continuous surface spaced from and facing toward the top surface of the lower mold to define a molding space for receiving the liquid foam resin.

6. A mold for skin covered foamed plastic molding, comprising:
   a lower mold having a top surface onto which a skin cover is to be placed so that a liquid foam resin is poured onto the skin cover;
   an upper mold to be assembled with the lower mold and having a bent portion defining a body which terminates along a truncated bottom surface facing the top surface of the lower mold when the upper mold is assembled with the lower mold; and
   a middle mold to be placed between the upper mold and the lower mold and having a hollow region extending therethrough for receiving the body of the bent portion of the upper mold so that the top surface of the lower mold and the truncated bottom surface of the upper mold face each other through the hollow region when the upper mold and the lower mold are assembled together with the middle mold placed therebetween wherein the lower mold has support holes and the middle mold has supporting rod members for insertion into the support holes of the lower mold to support the middle mold with respect to the lower mold.

7. The mold of claim 6, wherein the body of the bent portion is substantially fully enclosed within the hollow region of the middle mold.

8. The mold of claim 6, wherein the middle mold includes bottom surface portions facing the top surface of the lower mold, and wherein the truncated bottom surface is substantially coplanar with the bottom surface portions of the middle mold.

* * * * *